United States Patent
Bonneau et al.

(10) Patent No.: US 10,131,865 B2
(45) Date of Patent: Nov. 20, 2018

(54) DEVICE FOR THE CONTROLLED TRANSFER OF VOLATILE GASES OR GASEOUS MOLECULES INTO A CONTAINER INTENDED TO CONTAIN A LIQUID OR SEMI-LIQUID FOOD PRODUCT

(71) Applicant: BIO-CORK SARL, Neuville sur Ain (FR)

(72) Inventors: Marc Bonneau, Lyons (FR);
Marguerite Calone-Bonneau, Lyons (FR)

(73) Assignee: BIO-CORK SARL, Neuville sur Ain (FR)

( * ) Notice: Subject to any disclaimer, the term of this patent is extended or adjusted under 35 U.S.C. 154(b) by 503 days.

(21) Appl. No.: 14/758,363

(22) PCT Filed: Dec. 20, 2013

(86) PCT No.: PCT/IB2013/061215
§ 371 (c)(1),
(2) Date: Jun. 29, 2015

(87) PCT Pub. No.: WO2014/102691
PCT Pub. Date: Jul. 3, 2014

(65) Prior Publication Data
US 2015/0353875 A1    Dec. 10, 2015

(30) Foreign Application Priority Data
Dec. 31, 2012   (FR) ...................................... 12 62995

(51) Int. Cl.
*B65D 39/00*    (2006.01)
*B65D 17/00*    (2006.01)
(Continued)

(52) U.S. Cl.
CPC ............ *C12G 1/00* (2013.01); *B01F 3/04099* (2013.01); *B65D 77/068* (2013.01);
(Continued)

(58) Field of Classification Search
CPC ........ B65D 11/00; B65D 17/00; B65D 17/06; B65D 39/00; B65D 77/00; B65D 77/04; B65D 81/00; B65D 81/24; B65D 81/26
(Continued)

(56) References Cited

U.S. PATENT DOCUMENTS 4,741,324 A * 5/1988 Ina ..................... B65D 81/3484
126/263.06
5,092,914 A    3/1992 Cullen
(Continued)

FOREIGN PATENT DOCUMENTS

| EP | 0799773 | 10/1997 |
|---|---|---|
| GB | 2401862 | 4/2005 |
| WO | WO2007/130608 | 11/2007 |

*Primary Examiner* — Michael Laflame, Jr.
(74) *Attorney, Agent, or Firm* — Defillo & Associates, Inc.; Evelyn A. Defillo

(57) ABSTRACT

According to the invention, this device includes a rigid capsule (2) forming a chamber (6) whereof one longitudinal end (6a) is open, and forming a longitudinal duct (7) for the flow of a liquid or semi-liquid food product (300); an active product (3) contained in the chamber (6), capable of absorbing a gas and/or volatile gaseous molecules present in the food product (300), or of diffusing a volatile gas and/or gaseous molecules into the food product (300); a cap (4) for closing the open longitudinal end (6a) of the chamber (6, having a penetrable septum (4c), the cap (4) being able, when it is placed on the capsule (2) and its septum (4c) is not perforated, to close the chamber (6) so that it is sealed against gases and water, and allowing, when it is perforated, a transfer of volatile gases and/or gaseous molecules between the outside and the inside of the chamber (6), and
(Continued)

a membrane (5) permeable to the volatile gases and/or gaseous molecules to be absorbed or diffused, placed in the chamber (6) so as to separate the active product (3) contained in the chamber (6) from the outside. The invention also relates to a closure for a container as described above, comprising the device (1), a method for manufacturing a container comprising such a closure, and a machine for implementing this method.

14 Claims, 2 Drawing Sheets

(51) Int. Cl.
*C12G 1/00* (2006.01)
*C12G 1/06* (2006.01)
*B01F 3/04* (2006.01)
*B65D 77/06* (2006.01)
*B65D 81/26* (2006.01)

(52) U.S. Cl.
CPC ............. *B65D 81/266* (2013.01); *C12G 1/06* (2013.01); *Y10T 29/49828* (2015.01)

(58) Field of Classification Search
USPC ........................................................ 99/323.1
See application file for complete search history.

(56) References Cited

U.S. PATENT DOCUMENTS

2007/0257046 A1\* 11/2007 Rault ................... B65D 51/244
220/675
2008/0272085 A1\* 11/2008 Laporta .............. B65D 39/0052
215/296
2011/0139670 A1 6/2011 Ciaramitaro \* cited by examiner

DEVICE FOR THE CONTROLLED TRANSFER OF VOLATILE GASES OR GASEOUS MOLECULES INTO A CONTAINER INTENDED TO CONTAIN A LIQUID OR SEMI-LIQUID FOOD PRODUCT

CROSS REFERENCE TO RELATED APPLICATION

This application is a national stage entry of PCT/IB2013/061215 filed Dec. 20, 2013, under the International Convention claiming priority over French Patent Application No. 12062995 filed Dec. 31, 2012.

FIELD OF THE INVENTION

The present invention relates to a controlled gas transfer device for the controlled transfer of volatile gases or gaseous molecules into a container intended to contain a liquid or semi-liquid food product, in particular wine. It also relates to a closure for such a container, in various formats (cap, lid, cover, tap), including this device. It also relates to a manufacturing method for manufacturing a container comprising such a closure. It further relates to the use of this device in the constitution of active closures for packaging used for appropriately storing a variety of foods including beverages and liquid food products.

BACKGROUND OF THE INVENTION

The term "controlled transfer of volatile gases or gaseous molecules" is used to indicate that the device is capable of either absorbing a gas or gaseous molecules present in the packaged food product and in the immediate environment of the said product, or of diffusing a gas or gaseous molecules in this food product and in the immediate environment of this product over a prolonged period of time, in particular the period extending over several weeks to several months that frequently separate the filling of the container and the opening of the said container by the consumer.

The "food product" in question is in particular wine but it may also be beer, or fruit juices, or vegetable juices, or, in a more general manner, liquid or semi-liquid food products.

The term "closure" is used to refer to any type of means to be used for closing off a container, in particular a tap valve designed to be fitted on to packaging for beverages made out of flexible synthetic material known by popular names such as pouches and "Bag-In-Box®".

The term "container", which shall exclusively be used in the present description, is to be understood in the most general manner, as including all types of containers, in particular flexible pouches or bags such as those used for wine packaging solutions known under the trade name "Bag-In-Box®", cubitainers, cardboard based parallelepipedic packages referred to as "bricks", diverse containers, barrels, casks, bottles, etc.

Apart from traditional containers that simply perform the functions of containment and physical protection of food products against the environmental factors encountered throughout the life cycle of the products, there are also containers that are referred to as "active" containers, which include absorption or diffusion devices for absorbing or diffusing one or more solid active products acting in a controlled manner on the food content in order to enhance and maintain the quality all across the entire distribution chain. These diffusion means are in particular contained in the walls and in the closure systems of these containers.

Existing devices are concerned with solid active products and are thus not designed nor adapted to bring about absorption or diffusion of a gas or gaseous molecules in a liquid or semi-liquid food product, in a sustained and controlled manner.

OBJECTS OF THE INVENTION

The main objective of the present invention is to provide a solution to remedy this shortcoming.

Another objective of the invention is to provide a device that makes it possible to transfer a volatile gas and/or volatile gaseous molecules of food grade quality, in particular oxygen ($O_2$), carbon dioxide ($CO_2$), sulfites ($SO_2$), pure nitrogen ($N_2$) or nitrogen compound ($N_2O$), argon (Ar), or volatile aromatic molecules (terpenols, thiols, methoxypyrazine, phenyl ethanol, esters and alcohols) into a container containing a liquid or semi-liquid food product, which makes possible a perfectly controlled transfer of volatile gases and/or these volatile molecules, particularly between time when the device is manufactured and the time when the device is placed in contact with the food.

SUMMARY OF THE INVENTION

According to the invention, the device comprises:

a rigid capsule forming a chamber whereof one longitudinal end is open, and forming a longitudinal duct for the flow of a liquid or semi-liquid food product;

an active product contained in the said chamber, capable of absorbing a volatile gas and/or volatile gaseous molecules present in the said food product or of diffusing a volatile gas and/or volatile gaseous molecules in this food product;

a closure cap for closing the said open longitudinal end of the chamber, comprising a penetrable septum, the said cap being able, when it is placed on the said capsule and its septum is not perforated, to close off the chamber in such a manner that it is sealed against gases and water, and allowing, when it is perforated, for a transfer of volatile gases and/or volatile gaseous molecules between the exterior and the interior of the chamber; and a gas permeable membrane permeable to the volatile gases and/or volatile gaseous molecules to be absorbed or diffused, placed in the chamber in a manner so as to separate the active product contained in the chamber from the exterior.

The device is constituted by placing the active product in the chamber and then attaching the membrane over the opening of the chamber and closing the said chamber in a sealed manner so as to be sealed tight against gas and water by means of the septum sealed cap.

When the septum is in a non-perforated state, the device does not bring about any absorption or diffusion of gas and may be stored, possibly over an extended period of time, without any alteration to its future effectiveness.

For its operational implementation, the device is placed in a housing arranged at the level of the upstream side of a tap valve, over the flow duct that includes this tap valve and upstream of the shutoff member thereof, in a manner such that the longitudinal duct that forms the capsule communicates with the flow duct that includes the tap valve and in such a manner that the said septum is situated on the upstream side of the tap valve and is accessible from the exterior of the tap valve; the septum that is included with the cap is thus able to be perforated just prior to the mounting of the tap valve on to the container, in order to make possible, once the tap valve has been mounted on the container, the placing in communication of the liquid or semi-liquid food product and the active product contained in the chamber, through the perforated septum and the said membrane.

The controlled gas transfer device according to the invention may also have different dimensions in a manner so as to fit properly and be accommodated in the interior cylindrical space either of a bottle neck, or of a closure (cap, stopper, lid, cover) of all types of containers containing liquid food.

The cap is advantageously made out of synthetic material molded in one piece, the said septum being formed by the thinning of this synthetic material.

The capsule is advantageously made out of synthetic material molded in one piece, this synthetic material and the material of which the cap is constituted being heat-sealable to each other.

The cap may thus be attached to the capsule in a sealed manner by means of heat sealing.

The membrane may be independent of the cap and may be attached to the capsule prior to the attachment of the cap. Preferably, however, the membrane is integrally secured to the cap, while being attached thereto so as to be set back away from the said septum in a manner such that this latter may be perforated without perforating the membrane.

The attachment of the membrane to the capsule is thus brought about in a rapid and simple manner.

The said membrane may be constituted of polyethylene (PE), and/or polypropylene (PP), and/or polylactic acid (PLA) and other polyesters, and/or polyamides, and/or polyvinyl alcohol polymers, and/or nylon, and/or Polyvinylidene fluoride (PVDF), and/or Polytetrafluoroethylene (PTFE), and/or Polyethersulfone (PES), and/or biopolymers (cellulose esters).

The closure according to the invention, in particular in the form of a tap valve, comprises a receiving housing for receiving the device, arranged at the level of the upstream side of the closure, on the flow duct that includes this closure and upstream of a shut-off member that includes the closure, device is placed in the housing in a manner such that the longitudinal duct that forms the capsule communicates with the flow duct that includes the closure and in such a manner that the said septum is situated on the upstream side of the closure and is accessible from the exterior of the closure.

When the said capsule and the part of the closure that delimits the said receiving housing have semicircular cross sections, and where, it is therefore necessary to angularly position the capsule in the receiving housing, the capsule comprises a longitudinal projection that is adapted to be inserted in a close fitting fashion in the portion of the flow duct that includes the closure, beyond the said receiving housing.

This close fitted insertion makes it possible to bring about the angular positioning of the capsule in the said receiving housing during the insertion of this capsule into the housing.

In a more general manner the invention also relates to any other format of capsule which is inserted into the duct of the closure and that includes at least one lateral flow duct through which the packaged liquid food product flows.

The method according to the invention for manufacturing a container designed to contain a liquid or semi-liquid food product and meant to be equipped with a closure for closing the flow of this liquid, includes the steps consisting of:

inserting the device into the receiving housing that includes the closure, by placing this device in the said housing in a manner such that the longitudinal duct that forms the capsule communicates with the flow duct that includes the closure and in a manner such that the said septum is situated on the upstream side of the closure and is accessible from exterior of the closure;

simultaneously with or subsequently after this insertion, perforating the said septum; and assembling the closure, thus equipped with the device, on to the container, in order to enable bringing about communication between the liquid or semi-liquid food product and the active product contained in the chamber, through the perforated septum and the said membrane.

The machine according to the invention for operationally implementing this method comprises:

a gripping clamp for gripping the device and for insertion of this device into the receiving housing that includes the closure; and a punch situated to be facing the said septum when the device is gripped by the clamp, this punch being movable between a retracted position that does not hinder the gripping by the clamp of the device and a deployed (advanced) perforation position for perforating the septum.

With regard to the active product, according to a first possibility, the device is an absorption device for absorbing the oxygen present in the container and/or in the liquid food product; the said active product is then advantageously formed of a mixture comprising of 40% to 60% of reducing oenological tannins such as proanthocyanidins, flavonoids, gallotannins, ellagitannins, phlorotannins, in the form of powders and/or particles, wood chips or wood fragments of oak, and 60% to 40% of dry and inactivated wine yeast of the genus *Saccharomyces*; the said membrane is then permeable to oxygen and water.

The capacity of the powder to absorb the ambient oxygen in such packaging is about 3000 nmol of $O_2$ per gram dry weight of powder. The device thus makes it possible to absorb in a regulated and continuous manner, the internal oxygen in the packaging and to consequently reduce the risk of denaturing oxidation of the packaged beverage, over several months. It thus plays a role in the maintenance of the organoleptic characteristics and in the quality of this beverage.

The said membrane is in particular a hydrophilic PVDF membrane having pores measuring 0.22µ, such as that marketed by the company Merck-Millipore.

Preferably, the powder contains a mixture of 50% of reducing oenological tannins and 50% of inactivated yeast.

According to a second possibility, the device is a diffusion device for diffusing nitrogen in the liquid or semi-liquid food product; the said active product is then advantageously liquid nitrogen.

The device thus formed diffuses the inerting gas in the container, which results in the relative dilution of the ambient oxygen, reduces as a consequence the risk of the denaturing oxidation of the packaged beverage and increases the shelf life period.

According to a third possibility, the device according to the invention is a carbon dioxide diffusing device for diffusing carbon dioxide into the liquid or semi-liquid food product; the said active product is then advantageously formed of effervescent granules obtained from the following powder mixture:

| | |
|---|---|
| sodium bicarbonate (or baking soda) | 100 g |
| ascorbic acid | 50 g. |

The said membrane may also be in this case a hydrophilic PVDF membrane having pore measuring 0.22µ, such as that marketed by the company PAL.

According to a fourth possibility, the device according to the invention is a carbon dioxide diffusing device for diffusing carbon dioxide into the liquid or semi-liquid food product; the said active product is then advantageously formed of dry ice granules.

According to a fifth possibility, the device according to the invention is a sulfur dioxide diffusing device for diffusing sulfur dioxide into the liquid or semi-liquid food product; the said active product is then advantageously formed by a gel resulting from the following mixture:

| agarose food grade: | 20 g, |
|---|---|
| potassium metabisulfite: | 20 g, |
| distilled water: qsp (quantity sufficient for) | 1000 ml. |

In this fifth possibility of active product, the said membrane is preferably a hydrophobic PTFE membrane having pores measuring $0.1\mu$, in particular marketed by the company Merck-Millipore.

This device is in particular designed to be fitted into the neck of a tap valve of a container for beverage (wines, ciders, beers, fruit and vegetable juices, fruit syrups); it makes possible for example a slow and regular release of sulfur dioxide contained in the chamber and its diffusion at the rate of 0.5 mg per day through the membrane to a packaged wine, in which is thus maintained a concentration of sulfur dioxide that is still greater than 10 mg/L. This concentration of between 10 mg/L and 30 mg/L for a period of several months gives the wine antioxidant and antiseptic protection over a long term that is favourable for its marketing channel.

According to one variant of this sulfur dioxide diffusing device, the said active product is formed from a mixture of one or more sulphites (E220 to E228), included in a gel of natural polysaccharides, alone or combined, such as alginates, or starches, or carrageenans, or celluloses and hemicelluloses, or fructans, or arabic gum, or xanthan gum, or glucans, or galactans, or glycans, or pectins. In an alternative manner the mixture may be formed of sulphites incorporated into a gel of proteins such as for example gelatin, albumin or casein. The said membrane may, by way of a variant to the one mentioned above, be made out of polyethylene (PE), polypropylene (PP), polylactic acid (PLA) and other polyesters, polyamides, vinyl alcohol polymers, nylon, Polyvinylidene fluoride (PVDF), Polytetrafluoroethylene (PTFE), Polyethersulfone (PES), organic polymers (cellulose esters).

In a more general manner, the said chamber may contain, in pure or combined forms, gases such as $O_2$, $CO_2$, $SO_2$, $N_2$, $N_2O$, Ar, He, and/or volatile aromatic molecules such as terpenols, thiols, methoxypyrazine, phenylethanol, dimethyl sulfide, volatile esters and alcohols, mixed with natural sequestering compounds such as agaroses, alginates, starches, carrageenans, celluloses and hemicelluloses, fructans, gum arabic, xanthan, glucans, galactans, glycans, pectins, or paraffin.

BRIEF DESCRIPTION OF THE DRAWINGS

The invention will be better understood and other characteristic features and advantages thereof will become apparent, in reference to the accompanying schematic drawings, representing by way of nonlimiting example, one embodiment of the gas transfer device and the tap valve concerned.

DETAILED DESCRIPTION OF THE INVENTION

Figure 5:
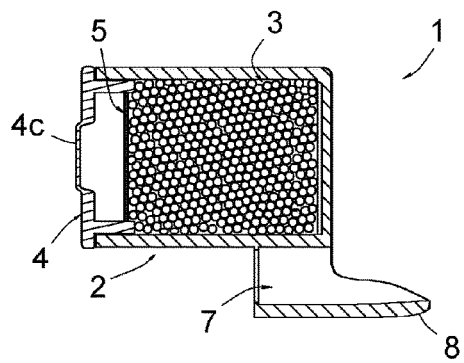
FIG. 5 is a view of the device in longitudinal cross-section, formed by the capsule and the cap.
Figure 6:
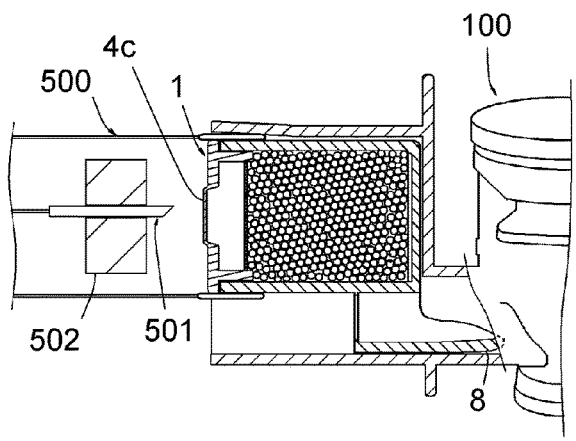
FIG. 6 is a view of the device that is similar to that in FIG. 5 and of the tap valve that is similar to that in FIG. 4, during the placement of the device into the tap valve, the said FIG. 6 also showing, in a highly schematic manner, a gripping and insertion clamp in the position of gripping and insertion of the device, and a perforation punch for perforating a septum that is included with the lid, in the retracted position.
Figure 7:
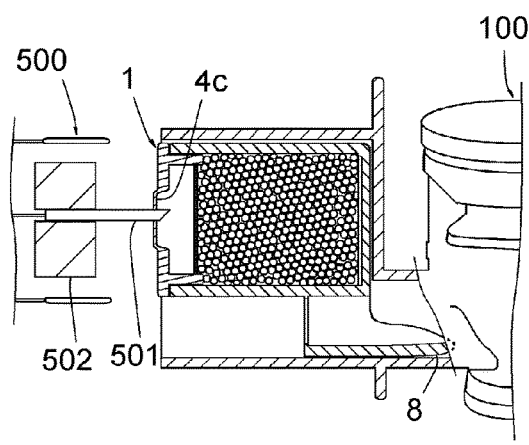
FIG. 7 is a view of the device and of the tap valve that is similar to that in FIG. 6, the clamp being in a retracted position and the punch being in a deployed (advanced) perforation position.
Figure 8:
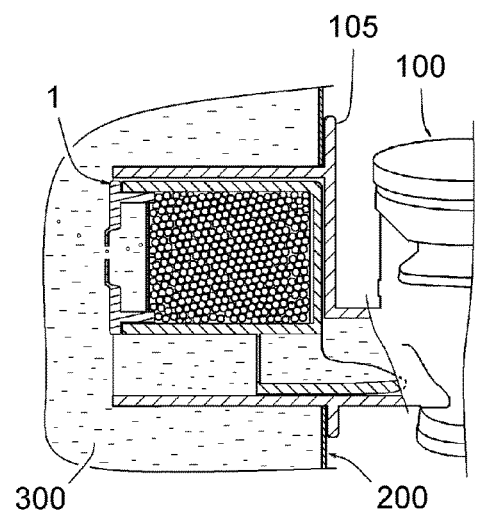
FIG. 8 is a view of the device and of the tap valve that is similar to that in FIG. 7, after mounting on a container and filling of the said container with a liquid or semi-liquid food product.

FIG. 5 represents a gas transfer device 1 for controlled transfer of a gas into a container intended to contain a liquid or semi-liquid food product, the said device 1 being designed to be inserted into a tap valve 100, visible in FIGS. 4 and 6 to 8, which itself is designed to be attached on to the wall of the container 200, visible in FIG. 8, the said container containing a liquid or semi-liquid food product 300, in particular wine.

The device 1 comprises a capsule 2, an active product 3, a closure cap 4, and a membrane 5, which, in the example represented, is integrally secured to the cap 4.

Figure 1:
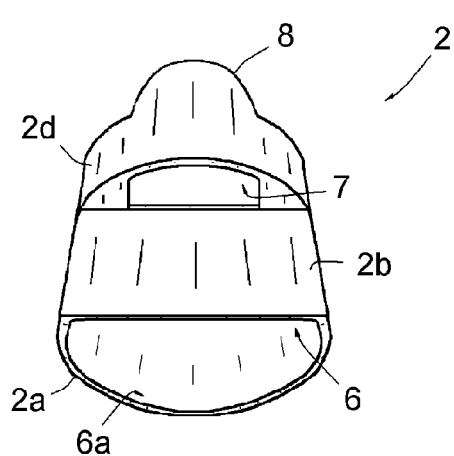
FIG. 1 is a perspective view of a capsule that comprises the device, seen from the lower side of the capsule.
Figure 3:
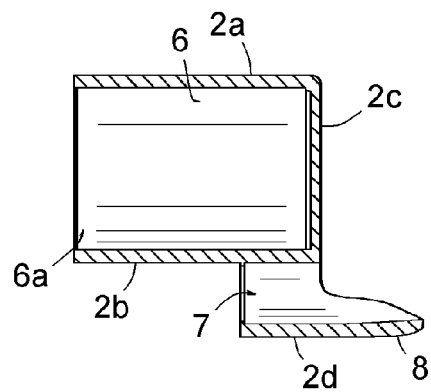
FIG. 3 is a view of the capsule in cross-section passing through the longitudinal centre plane of the capsule.
Figure 4:
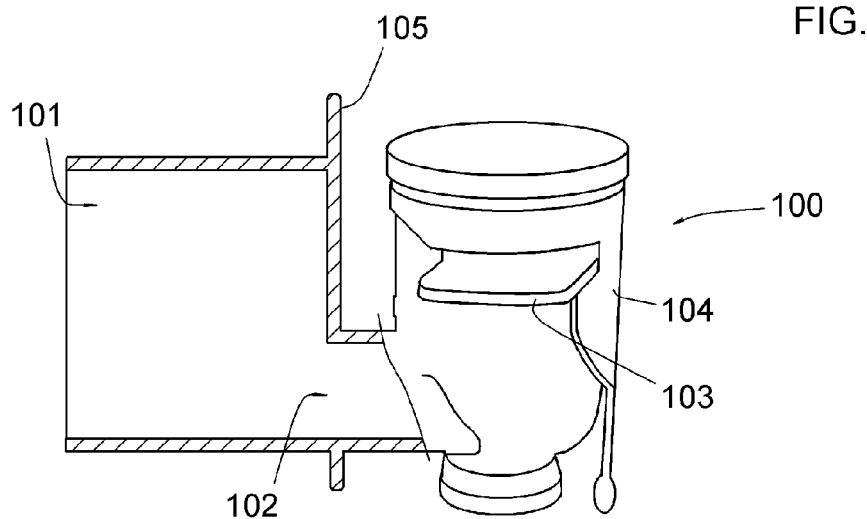
FIG. 4 is a view from the side, in partial cross section, of a tap valve intended to be fitted on to a wine package known by the trade name "Bag-In-Box®"

As is shown more particularly in FIGS. 1 and 3, the capsule 2 forms a chamber 6 whereof one longitudinal end 6a is opened, a longitudinal duct 7, and a longitudinal spout 8 that projects out from the longitudinal side opposite the longitudinal end 6a.

The chamber 6 is delimited by a wall 2a having a substantially truncated cylindrical shaped form, a planar wall 2b, and a bottom wall 2c closing the end of the chamber 6 positioned opposite the open end 6a.

The longitudinal duct 7 is delimited by a rounded wall 2d of the capsule 2, that comes to extend the wall 2a from the side of the bottom wall 2c so as to form a portion of the capsule that has a circular cross-section.

This portion of circular cross-section is dimensioned in a manner so as to be able to get engaged in a close fitting fashion in a housing 101 of a corresponding cylindrical form that is formed by the tap valve 100, as shown in FIGS. 4 and 6 to 8. This housing 101 is situated on the upstream end of the tap valve 100 (relative to the direction of flow of the wine through the tap valve 100) and communicates with the duct 102 for the wine to flow through the tap valve.

The longitudinal spout 8 extends the wall 2d opposite the duct 7. Its form has a rounded shape having the same radius as this wall 2d and presents a curved contour. This spout 8 is dimensioned in a manner so as to be insertable in a close fitted way in the duct 102, its form making it possible to slightly reduce the cross section of this duct while ensuring the angular positioning of the capsule 2, and therefore of the device 1, in the housing 101.

The capsule 2, made of a heat-sealable synthetic material, is moulded in one piece.

The active product 3 is represented in the form of granules in the example shown in FIGS. 5 to 8. In particular, when the device 1 is intended to be used to diffuse the carbon dioxide in the liquid or semi-liquid food product 300, it may be effervescent granules obtained from the mixture of 100 g of sodium bicarbonate and 50 g of ascorbic acid.

Figure 2:
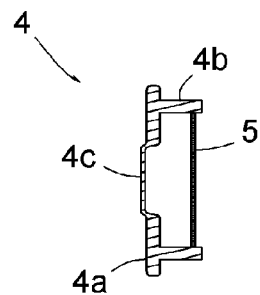
FIG. 2 is a transverse cross-sectional view of a closure cap that also comprises this device.

As visible in FIGS. 2 and 5, the cap 4 comprises an end wall 4a dimensioned in such manner as to overlie and cover the edge of the wall 2a that delimits the open end 6a, and a skirt 4b dimensioned in such manner as to be able to get engaged closely in the chamber 6. The wall 4a includes a thinned central portion forming a septum 4c that is sealed tight against water and gas, but is preferable by a punch.

The cap 4 is moulded in one piece and made of a heat-sealable synthetic material, which allows for heat sealing with the material of the capsule 2.

The membrane 5 is permeable to carbon dioxide but impermeable to water. It is fixed to the skirt 4b, positioned to be set back away from the septum 4c, in such a way that this latter may be perforated without perforation of the membrane 5, as shown in FIG. 7.

The device 1 is constituted by placing the active product 3 in the chamber 6 and then inserting the cap 4 in the open end 6a, as is visible in FIG. 5, and by heat-sealing this cap on to the wall 2a. The chamber 6 is thus closed in a manner so as to be sealed against gas and water, such that the device 1 can be stored, possibly over an extended period of time, without any alteration to its future gas diffusion effectiveness.

The tap valve 100, apart from the housing 101, is of a conventional type, comprising a double vane 103 for operating the shut-off member that it includes and a tear-away belt 104, for blocking of this vane 103 before opening of the container 200. It also includes a flange 105 that enables its connection with the wall of this container 200, as is visible in FIG. 8.

FIGS. 6 and 7 represent, highly schematically, a clamp 500 and a punch 501 that form part of a machine that makes it possible to insert in a mechanised fashion the device 1 into the housing 101 of the tap valve 100 and to activate the diffusion of the gas by means of the perforation of the septum 4c. The clamp 500 includes two jaws that provide the ability to grip the device 1 and to insert it into the housing 101, with insertion of the spout 8 in the duct 102, as is visible in FIG. 6. The punch 501, situated between these jaws, is then in a retracted position that does not hinder the gripping of the device 1 by the clamp 500.

Once the device 1 is placed in position in the housing 102, the clamp 500 is slightly opened and moved into a retracted position, then the punch 501, guided by a block piece 502, is actuated to a deployed perforation position for perforating the septum 4c, as shown in FIG. 7.

The tap valve 100, thus fitted with the device 1, is subsequently assembled with the casing envelope forming the container 200, by means of heat sealing the flange 105 to this casing envelope, and then the casing envelope is filled with the liquid or semi-liquid food product 300. This latter comes in contact with the active product 3 through the perforated septum 4c and the membrane 5, as is visible in FIG. 8, which brings about the diffusion of the gas in this product 300.

As is apparent from the foregoing, the invention provides a gas transfer device for the controlled transfer of gas into a container intended to contain a liquid or semi-liquid food product, presenting the aforementioned decisive advantages as compared to the prior technology. It also provides a tap valve for such a container, comprising the said device, a manufacturing method for manufacturing a container comprising such a tap valve, and a machine for operationally implementing this method.

The invention has been described here above with reference to an embodiment given by way of example. It goes without saying that it is not limited to this single embodiment.

What is claimed is:

1. A controlled gas transfer device for the controlled transfer of volatile gases or gaseous molecules into a container intended to contain a liquid or semi-liquid food product, the device comprising:
    a rigid capsule comprising a wall that forms a chamber having one longitudinal open end, the wall being continuous such that the chamber is sealed against gases and water when a closure cap is placed on the longitudinal end and the rigid capsule forming a longitudinal duct for the flow of a liquid or semi-liquid food product, the longitudinal duct being separated from the chamber;
    an active product contained in the said chamber, the active product diffuses a volatile gas and/or volatile gaseous molecules in the food product;
    the closure cap for closing the said open longitudinal end of the chamber, comprising a penetrable septum, the said cap being able, when it is placed on the said capsule and the septum is not perforated, to close off the chamber in such a manner that it is sealed against gases and water, and allowing, when it is perforated, for a transfer of volatile gases and/or volatile gaseous molecules between the exterior and the interior of the chamber; and
    a gas permeable membrane permeable to the volatile gases and/or volatile gaseous molecules to be diffused, placed in the chamber in a manner so as to separate the active product contained in the chamber from the exterior.

2. The controlled gas transfer device as claimed in claim 1, wherein the cap is made out of a synthetic material molded in one piece, the septum being formed by the thinning of the synthetic material.

3. The controlled gas transfer device as claimed in claim 2, wherein the capsule is made out of a synthetic material molded in one piece, the synthetic material and a material of which the cap is constituted being heat-sealable to each other.

4. The controlled gas transfer device as claimed in claim 1, wherein the membrane is integrally secured to the cap, while being attached thereto so as to be set back away from the said septum in a manner that the septum is perforated without perforating the membrane.

5. The controlled gas transfer device as claimed in claim 4, wherein the said membrane is constituted of polyethylene (PE), and/or polypropylene (PP), and/or polylactic acid (PLA) and other polyesters, and/or polyamides, and/or polyvinyl alcohol polymers, and/or nylon, and/or Polyvinylidene fluoride (PVDF), and/or Polytetrafluoroethylene (PTFE), and/or Polyethersulfone (PES), and/or biopolymers (cellulose esters).

6. A closure for a container intended to contain a liquid or semi-liquid food product in the form of a tap valve, the closure comprises:
   a receiving housing for receiving, in a close-fitted manner, the device according to claim 1, arranged at the level of the upstream side of the closure, on a flow duct that includes the closure and upstream of a shut-off member that includes the closure; the device is placed in the receiving housing in a manner that the longitudinal duct that forms the capsule communicates with the flow duct that includes the closure and the said septum is situated on the upstream side of the closure and is accessible from the exterior of the closure.

7. An assembly formed by the device according to claim 1 and a closure for a container intended to contain a liquid or semi-liquid food product in the form of a tap valve, the assembly comprises:
   a receiving housing for receiving the device according to claim 1, arranged at the level of the upstream side of the closure, on a flow duct that includes the closure and upstream of a shut-off member that includes the closure; the device is placed in the housing in a manner that the longitudinal duct that forms the capsule communicates with the flow duct that includes the closure and in such a manner that the said septum is situated on the upstream side of the closure and is accessible from the exterior of the closure;
   wherein said capsule and the portion of the closure defining said receiving housing have circular cross-sections, and in that the capsule comprises a longitudinal projection adapted to be snugly inserted in the portion of the flow duct that the closure includes, beyond said receiving housing.

8. The device as claimed in claim 1, wherein the device is a diffusion device for diffusing nitrogen in the liquid or semi-liquid food product and in that the said active product is liquid nitrogen.

9. The device as claimed in claim 1, wherein the device is a carbon dioxide diffusing device for diffusing carbon dioxide into the liquid or semi-liquid food product and in that the said active product is formed of effervescent granules obtained from the following powder mixture:

| | |
|---|---|
| sodium bicarbonate (or baking soda) | 100 g |
| ascorbic acid | 50 g. |

10. The device as claimed in claim 1, wherein the device is a carbon dioxide diffusing device for diffusing carbon dioxide into the liquid or semi-liquid food product, and in that the said active product is formed of dry ice granules.

11. The device as claimed in claim 1, wherein the device is a sulfur dioxide diffusing device for diffusing sulfur dioxide into the liquid or semi-liquid food product; the said active product is formed by a gel resulting from the following mixture:

| | |
|---|---|
| agarose food grade: | 20 g, |
| potassium metabisulfite: | 20 g, |
| distilled water: qsp (quantity sufficient for) | 1000 ml. |

12. The device as claimed in claim 1, wherein the device is an active sulfur dioxide diffusing device in the liquid or semi-liquid food product; and in that the said active product is formed from either a mixture of one or more sulphites (E220 to E228) with natural polysaccharides, including alginates, starches, carrageenans, celluloses and hemicelluloses, fructans, arabic gum, xanthan gum, glucans, galactans, glycans, pectins, or a mixture of sulphites with proteins including gelatin, albumin, or casein.

13. A controlled gas transfer device for the controlled transfer of volatile cases or gaseous molecules into a container intended to contain a liquid or semi-liquid food product, the device comprising:
   a rigid capsule comprising a wall that forms a chamber whereas one longitudinal end is open, the wall being continuous such that the chamber is sealed against gases and water when a closure cap is placed on the longitudinal end and the capsule forming a longitudinal duct for the flow of a liquid or semi-liquid food product, the longitudinal duct being separated from the chamber;
   an active product contained in the said chamber, capable of diffusing a volatile gas and/or volatile gaseous molecules in the food product;
   the closure cap for closing the said open longitudinal end of the chamber comprising a penetrable septum, the said cap being able, when it is placed on the said capsule and its septum is not perforated, to close off the chamber in such a manner that it is sealed against gases and water, and allowing, when it is perforated, for a transfer of volatile gases and/or volatile gaseous molecules between the exterior and the interior of the chamber; and
   a gas permeable membrane permeable to the volatile gases and/or volatile gaseous molecules to be diffused placed in the chamber in a manner so as to separate the active product contained in the chamber from the exterior;
wherein said chamber contains, in pure or combined forms, gases including $O_2$, $CO_2$, $SO_2$, $N_2$, $N_2O$, Ar, He, and/or volatile aromatic molecules such as terpenols, thiols, methoxypyrazine, phenylethanol, dimethyl sulfide, volatile esters and alcohols, mixed with natural sequestering compounds including agaroses, alginates, starches, carrageenans, celluloses and hemicelluloses, fructans, gum arabic, xanthan, glucans, galactans, glycans, pectins, or paraffin.

14. A controlled gas transfer device for the controlled transfer of volatile gases or gaseous molecules into a container intended to contain a liquid or semi-liquid food product, the device comprising:
   a rigid capsule comprising a chamber, an open end, a longitudinal duct, and a longitudinal spout that projects out opposite from the longitudinal open end, the chamber is delimited by a wall, a planar wall, and a bottom wall that closes an end of the chamber positioned opposite to the open end, the longitudinal duct is delimited by a round wall of the rigid capsule that extends, the longitudinal spout extends from the round wall opposite to the longitudinal duct;
   a closure cap secured to the open end of the chamber, the closure cap seals the chamber against gases and water when placed on the open end of the chamber, the closure cap for closing the said open longitudinal end of the chamber, the closure cap includes a septum;
   an active product contained in the said chamber, the active product diffuses a volatile gas and/or volatile gaseous molecules in the food product;
   a gas permeable membrane permeable to the volatile gases and/or volatile gaseous molecules to be diffused, placed in the chamber in a manner so as to separate the active product contained in the chamber from the exterior;

wherein when the septum is not perforated, the closure cap seals the chamber against gases and water; and wherein when the septum is perforated transfer volatile gases and/or volatile gaseous molecules between the exterior and the interior of the chamber.

\* \* \* \* \*